United States Patent Office 3,491,061
Patented Jan. 20, 1970

---

3,491,061
BUFFERING AGENTS IN INTERFACIAL
PHOSPHORUS POLYESTER PROCESS
Frank Millich, 7227 Highland Ave., Kansas City, Mo. 64131, and Charles E. Carraher, 119 N. Harvard, Vermillion, S. Dak. 57069
No Drawing. Filed Jan. 11, 1968, Ser. No. 697,033
Int. Cl. C08g 33/16
U.S. Cl. 260—47
10 Claims

ABSTRACT OF THE DISCLOSURE

Polyphosphate, polyphosphonate and polyphosphorylamide polymers are prepared by the interfacial polymerization of polyhydroxylic compounds and phosphorous oxytrihalides or derivatives of organophosphoric and organophosphonic acids.

BACKGROUND OF THE INVENTION

Polyphosphate, polyphosphonate and polyphosphorylamide polymers have many commercial applications. Polyphosphate and polyphosphonate polymers can be readily extruded and are generally suitable as molding resins. The polymers highly resistant to acids, water, and organic solvents are flame retardants, and bonding agents. Polyphosphate polymers are highly effective as coatings to prevent corrosion of metal surfaces. Linear polyphosphonates are thermoplastic, having high impact strengths and excellent hardness.

Conventionally, resinous materials of this class have been prepared by heating in anhydrous conditions a dihydroxylic phenol and an acid dichloride of phosphoric or phosphonic acid for several hours during which corrosive hydrogen chloride gas is evolved. Long reaction times at elevated temperatures are required in preparation of the resinous materials of this invention by conventional processes. These processes also require the use of corrosive resistant and, therefore, costly process equipment.

Less frequently, resinous materials of this class have been prepared in a medium, such as benzene, in which all reacting components were soluble (solution polymerization), and at times the polymerization has been conducted in the presence of a soluble base substance such as pyridiene. Reference is made to U.S. Patent 2,636,876 for a more complete description of the process.

An object of our invention is to provide an improved process for the preparation of polyphosphate, polyphosphonate and polyphosphorylamide polymers.

In another aspect, an object of our invention is to provide a novel interfacial polymerization process for the preparation of polyphosphate, polyphosphonate and polyphosphorylamide polymers.

Other objects, advantages and features of our invention will be readily apparent to those skilled in the art from the following description and the appendent claims.

SUMMARY OF INVENTION

By the invention a phosphorylating reactant selected from the group consisting of phosphorous oxytrihalides or derivatives of organophosphoric and phosphonic acids is dissolved in an organic solvent and the organic solution contacted with an aqueous solution of a polyhydroxylic-aromatic or aliphatic reactant containing an alkaline buffer in controlled concentration to ionize the hydroxyl groups of the polyhydroxylic reactant to produce the corresponding anion. The resulting interfacially produced polymer is recovered from the polymerization system by conventional separation processes.

In a second embodiment of the invention the reactant in the aqueous phase can be a polyamine which results in the production of a polyphosphoryl amide. In this embodiment of the invention the polymerization is conducted in the presence of sufficient alkaline buffer such that the reaction time is rapid, all acids generated during the reaction are neutralized, and the alkalinity of the medium is maintained below a value above which polymer degradation by excess base is kept to a minimum.

The inventive process is a substantial improvement over conventional processes in that the process can be conducted at room temperature with a polymerization rate of a fraction of a minute. This is contrasted to the fusion and to the solution polymerization methods of previous conventional processes which involve hours of heating at elevated temperatures.

DESCRIPTION OF INVENTION

The phosphorylating agent employed in the polymerization process can have the following structure:

where X is selected from the group consisting of halogens and OR; Y is selected from the group consisting of halogens, R, OR, NR$_2$, and SR; and R is selected from the group consisting of alkyl groups, phenyl groups, alkenyl groups, aralkyl groups and derivatives thereof, such as halo-derivatives. Phosphorylating agents which have been found to be particularly effective in the practice of the invention are phenyl phosphonic dichloride, POCl$_2$C$_6$H$_5$; phenyl phosphorodichloridate, POCl$_2$(OC$_6$H$_5$); and phosphorous oxychloride, POCl$_3$.

The phosphorylating reagent is dissolved in an inert organic solvent prior to the introduction of the phosphorylating agent and organic solvent into the polymerization reaction and must be one that is immiscible with the water phase employed in the interfacial polymerization system. Organic solvents which have been found to be particularly useful in the practice of this invention are normal heptane, benzene, toluene, carbon tetrachloride, cyclohexane, bromobenzene, and 1,2-dichloroethane. There is no criticality with respect to the concentration of phosphorylating reagent in the organic solvent but high yields of polymer product have been obtained employing a phosphorylating agent concentration range of 0.1 to 1.0 moles per liter.

Polyhydroxylic compounds found to be useful in preparation of the polymers of this invention include both aliphatic and aromatic compounds and derivatives thereof, such as halo-derivatives. The use of dihydroxylic or diamine compounds with difunctional phosphorylating agent in the polymerization will result in the preparation of linear polymers. Tri-functional and higher functional compounds result in the preparation of crosslinked polymer products. Suitable polyhydroxylic compounds, although not to be limited thereto, include resorcinol, hydroquinone, bisphenol - A, ethylene glycol, 1,3 - dihydroxy acetone, 2,2-dimethyl-1,3-propanediol, 1,4-butanediol, and 1,4-cyclohexanol.

Polyamines as the term is herein employed also include derivatives thereof, such as halo-derivatives; suitable polyamines include aromatic diamines and aliphatic diamines such as 1,6-hexamethylene diamine. The polyhydroxylic compounds employed in the process of this invention are soluble in the alkaline aqueous phase. Although no criticality is known with respect to the relative concentrations of phosphorylating and polyhydroxylic or polyamine reactants, high polymer yields have been obtained in a barium hydroxide aqueous system wherein the ratio of phosphorylating agent to polyhydroxylic or polyamine agent varies from about 2 to 1 to 1 to 2.

The polyhydroxylic or polyamine compound is dissolved in the aqueous medium and the aqueous medium adjusted to a pH in the range of from about 8 to about 14. The pH of the aqueous medium is maintained substantially constant within this range throughout the polymerization. In the use of a polyhydroxylic compound, the pH of the aqueous medium must be maintained sufficiently alkaline during the polymerization process to effect ionization of the hydroxyl groups of the polyhydroxylic reactant and produce the corresponding fast-reacting anion. The anion attacks the phosphorylating reactant during the polymerization process. Buffering agents are employed in the polymerization zone to effectively control the pH in the aqueous medium.

As employed in this invention, buffering agents relate to compounds which, by reason of their limited solubility in the aqueous system, provide a buffering action to maintain a pH in the desired range or compounds which by reason of their being weak acids and having specific ionization constants act to buffer the system so as to maintain the pH in the desired range. The buffering agent must be capable of maintaining the pH substantially constant in the desired range and yet provide sufficient capacity to neutralize, for example, the hydrochloric acid that is emitted in the polymerization reaction of a chlorine containing phosphorylating reactant. Acidic buffering agents which have been found to be particularly suitable in the practice of this invention are sodium bicarbonate, sodium carbonate, sodium triphosphate, disodium monophosphate, and a mixture of sodium hydroxide and potassium chloride. Examples of buffering agents which function by virtue of limited solubility in water are calcium hydroxide and barium hydroxide.

Poor control of the concentration of buffering agent in the aqueous medium during the polymerization process may result in polymer degradation, i.e., lowering the molecular weight and a wide dispersity of molecular weights. If, for example, hydroxide ion concentration changes continually during the polymerization process the time schedule of competing reactions is altered, with an expectant change in the range of molecular weights found in the product polymer. These competing reactions are (a) polymer formation, (b) hydrolysis of the phosphorylating agent, (c) oxidation of polyhydroxylic compound, if oxygen is present, and (d) polymer degradation. High concentrations of hydroxide ion is deleterious to the polymers; the presence of oxygen and hydroxide ion are deleterious to polyhydroxylic reactants such as hydroquinone. Insufficient concentrations of buffering agent cause failure of the polymerization reaction, resulting in low conversion and low molecular weight of the polymer product. Desirably, the buffering agent employed must be present in sufficient concentration to promote rapid reaction rates without producing high hydroxide concentrations.

Strong bases such as calcium hydroxide and barium hydroxide, which have a limited solubility in water, are particularly effective in controlling the pH of the aqueous medium. An excess of the strong base can be employed and the presence of the excess in the aqueous medium as finely divided solids forms a reservoir and enters into the aqueouse medium as the barium hydroxide is consumed during the polymerization process, thus maintaining the pH of the aqueous medium close to its original value thruoghout the entire polymerization process. Additionally, the particulate nature of the solid particles of barium hydroxide assist in increasing the total number of droplets in a stirred reaction and in increasing the surface area of the interface between the organic and aqueous phase, thereby substantially increasing the effectiveness of the polymerization process.

The polymerization is conducted in an oxygen-free system. An inert gas such as nitrogen can be employed to purge the reaction zone. The polymerization reaction can be conducted at ambient temperatures. However, elevated temperature (below the boiling point of volatile components) and reduced temperatures (above the freezing point of the liquids) can be used effectively to increase polymer yields.

Polymerization occurs at a rapid rate upon contacting the organic and aqueous phases. High speed stirring, such as that produced in a Waring Blendor, increasing the total number of droplets of small size, can effectively be employed to accelerate the rate of product accumulation and thus to increase total yield, although stirring is not essential. Reaction times substantially less than one minute have often been observed in the stirred systems reported above. Polymer growth occurs at or about the interface until such time as the growing polymer chain exceeds its solubility in either or both phases and mechanical forces cause separation of liquids and solids. Without the protective organic shield which hydrophobic solvents can provide, polyphosphoryl ester and amides can suffer attack by high concentrations of hydroxide ions, and undergo degradation and hydrolysis. Polymer formation continues to occur, mostly at the interface, until such time that the active ends are rendered inactive through hydrolysis or other termination process steps.

The polymer product can be separated from the two-phase polymerization system by conventional separation processes such as filtration, centrifugation and decantation. The polymer product thus obtained is of narrow molecular weight range, having weight-average to number-average molecular weight ratios below 3, and of high molecular weight ranging to above 200,000 for polyorganophosphonates. Such high molecular weight polymers are insolube in acetone, tertiary butanol, water, benzene, carbon tetrachloride and dimethylformamide, but are soluble in dimethyl sulfoxide. These product polymers are of higher molecular weight than heretofore conventionally produced polyphosphates and polyphosphonates and are linear in structure. As heretofore noted crosslinked polymers can be produced by utilization of trifunctional polyhydroxylic compounds.

The following examples are presented as illustrative of the objects, advantages and features of our invention. It is not intended, however, that the invention should be limited to the specific embodiments presented therein.

EXAMPLE I

Hydroquinone (2.31 g., 0.021 mole) and $Ba(OH)_2 \cdot 8H_2O$ (12.6 g., 0.040 mole) are added to a one pint Kimax Emulsifying Mill Jar of a Waring Blendor, the cap of which is fitted with an inlet and outlet for a purging stream of nitrogen gas, and an inlet for the addition of liquids. Nitrogen gas is run through the reaction jar for about 5 minutes prior to the addition of water and is continued thereafter until the reaction is complete. One hundred ml. of water is introduced into the jar. The blender stirring, at 15,000 r.p.m., is started. After a few minutes phenylphosphonic dichloride, $POCl_{2\phi}$, (4.10 g., 0.021 mole) in 100 ml. $CCl_4$ is allowed to flow freely into the reaction jar. The blender is left on for 10 seconds after the last of the organic phase has entered the jar, then 50 ml. of 1 N-HCl is added to acidify the mixture, and the blender is turned off. The polymer product is a white, tacky solid and is filtered from the two-phase polymerization and is washed 3 times with 200 ml. portions of water, and once with 100 ml. $CCl_4$. The dried solid product weighs 3.24 g. (66% yield). The product has a limiting viscosity number (LVN) in dimethylsulfoxide (DMSO) of 28 ml./g. The pH of the saturated $Ba(OH) \cdot 8H_2O$ reaction system is above 13. The reaction is conducted at room temperature of about 20°C.

The product is separated into fractions by addition of a sequence of solvents. Partial solution in 100 ml. of acetone yields an original acetone soluble polymer solution (OAS) which is separated by filtartion from the original acetone insoluble polymer fraction (OAI). The OAI polymer is dried and weighed, giving 1.37 g., (28% yield), and has a LVN in DMSO of 50 ml./g. It is brownish-white in appearance.

A yield 1.86 g. (38%) is found having a reduced specific viscosity, $$\eta_{red}^{1\%}$$

in dimethylformamide (DMF) of 8 ml./g. for the OAS polymer and it is light tan and has a glass-like appearance. The acetone solution of OAS is evaporated to 20 ml. over a steam bath and added to 200 ml. t-butyl alcohol and the resulting solution heated over a steam bath for 8 hours and then left at room temperature for another 2 days, and the solid precipitate which is formed is separated from other liquid by filtration. The solid is washed with two portions of 25 ml. of t-butyl alcohol, dried and weighed. The weight of t-butyl alcohol insoluble polymer (BAI) is 0.44 g. with a LVN in DMSO of 21 ml./g. The BAI product is tan and granular in appearance and is no longer soluble in acetone. The liquid t-butyl alcohol-polymer solution is evaporated to dryness to give 1.42 g. (29% yield) of a light tan glass-like product (BAS) and has a LVN in DMF of 5 ml./g. and is still soluble in acetone.

EXAMPLE II

At 20° C., in a nitrogen atmosphere, in a blender, phenylphosphonic dichloride (4.10 g., 0.021 mole) in 100 ml. $CCl_4$ is added to a stirred buffering aqueous phase consisting of 100 ml. water, $Na_3PO_4$ (4.6 g., 0.028 mole), $Na_2HPO_4$ (7.95 g., 0.056 mole) and hydroquinone (2.31 g., 0.021 mole) (measured initial pH= 10.1) as described in Example I. After 10 seconds stirring the polymer product is isolated by filtration of the alkaline mixture. The unfractionated product has a LVN of 13 ml./g. in DMSO, weighs 2.25 g. (46% yield), and has a weight average molecular weight $\overline{M}w$) of $3.4 \times 10^4$ and a ratio of weight average molecular weight-to-number average molecular weight ($\overline{M}_w/\overline{M}_n$) of 2.14. The following fractions, weights, $\overline{M}_w$, $\overline{M}_n$, and LVN in DMSO were obtained from the product: OAS, 1.91 g., $1.8 \times 10^4$, $1.3 \times 10^4$, 10 ml./g.; OAI, 0.25 g., $2.0 \times 10^5$, 48 ml./g.; BAS, 1.81 g., $4.9 \times 10^4$, $2.6 \times 10^4$, 4 ml./g.; BAI, 0.10 g., $6.6 \times 10^4$, 20 ml./g. Thus the unfractionated product has a low molecular weight distribution ($\overline{M}_w/\overline{M}_n$=2.14) and shows a pH effect when compared with the polymer produced in Example I.

EXAMPLE III

Example II is repeated using a reaction temperature of 60° C. A polymer yield of 3.13 g. (64% yield) and a LVN in DMSO of 13 ml./g. is found. Thus, polymer yield is increased, in this reaction system as the reaction temperature is increased from 20 to 60° C.

EXAMPLE IV

Example II is repeated at 41°C. and gives a yield of 2.64 g. with a LVN in DMSO of 13 ml./g.

EXAMPLE V

Phenylphosphonic dichloride (4.10 g., 0.021 mole) in 50 ml. $CCl_4$ and hydroquinone (2.31 g., 0.021 mole) in 150 ml. water containing 12.6 g., 0.040 mole, of Ba $(OH)_2 \cdot 8H_2O$ are reacted and polymer separated as described in Example I. The blender is run for 10 seconds. The yield of polymer is 3.09 g. (63% yield), having a LVN in DMSO of 20 ml./g.

EXAMPLE VI

The above preparation is repeated except that 0.5 g. of fullers earth is first added to the blender jar. The polymer yield is 4.16 g., having a LVN of 23 ml./g. in DMSO. It is shown by the above example that polymer yield and molecular weight is increased, in this preparation, by addition of inert, insoluble material.

EXAMPLE VII

Phenylphosphonic dichloride (4.10 g. 0.021 mole) in 50 ml. $CCl_4$ and 2,2-dimethyl-1,4-propanediol (2.14 g. 0.021 mole) in 50 ml. of water containing 9.4 g. (0.030 mole) of $Ba(OH)_2 \cdot 8H_2O$ are reacted as described in Example I except that it was not necessary to exclude air with a nitrogen atmosphere. The blender is run for 10 seconds and polymer separated. The product, which represents a yield of 1.28 g. (28% yield), is brownish-white and somewhat tacky having a melting range of 110–118° C. and a LVN in DMSO of 9 ml./g.

EXAMPLE VIII

Phenylphosphorodichloridate, $POCl_2OC_6H_5$, boiling boiling point 130–135°/20 minutes, 4.43 g., 0.021 mole) in 50 ml. $CCl_4$ and hydroquinone (2.31 g. 0.021 mole) in 100 ml. water containing $Ba(OH)_2 \cdot 8H_2O$ (9.46 g., 0.030 mole) are reacted in the blender for 6 minutes. The yield of dried polyphosphate product is 2.61 g. (50%) and has a LVN in DMSO of 10 ml./g.

EXAMPLE IX

Phenylphosphonic dichloride (4.10 g.) in 50 ml. $CCl_4$ and hydroquinone (2.31 g.) in 50 ml. $H_2O$ to which $Ba(OH)_2 \cdot 8H_2O$ (112.6 g.) has been added is reacted as described in Example I. The polymer yield is 3.14 g., and has a LVN in DMSO of 38 ml./g.

EXAMPLE X

Example IX was repeated except for using 4.62 g. of hydroquinone to react with 410 g of phenylphosphonic dichloride. The polymer yield is 4.21 g. having a LVN in DMSO of 44 ml./g.

EXAMPLE XI

Example IX was repeated except for using 8.2 g. of phenylphosphonic dichloride to react with 2.31 g. of hydroquinone. Polymer yield is 4.66 g. having a LVN in DMSO of 47 ml./g.

EXAMPLE XII

Stabilities of unfractionated polymers in various reaction media under reaction conditions are tested as follows. The studies are performed by placing in the reaction jar 2.0 grams of polymer made from hydroquinone and phenylphosphonic dichloride (LVN=12 ml./g., 100 ml. aqueous phase, and 100 ml. of $CCl_4$. The blender is turned on for a given period of time and the solid recovered, dried, weighed, and viscometry determined on the solid. The results are given in the accompanying table. It is concluded that in high pH systems (i.e., aqueous 5-molar NaOH) the polymer is unstable under reaction conditions, even for short periods of time. It is also apparent that in saturated $Ba(OH)_2 \cdot 8H_2O$ systems (i.e., lower pH systems) the polymer is stable under reaction conditions for a period of time up to several minutes.

| Aqueous Solution | Time (min.) | Weight of Product (g.) | Final LVN (ml./g.) |
| --- | --- | --- | --- |
| (1) Saturated $Ba(OH)_2 \cdot 8H_2O$ | 5 | 1.96 | 21 |
| (2) Saturated $Ba(OH)_2 \cdot 8H_2O$ | 5 | 1.95 | 19 |
| (3) Saturated $Ba(OH)_2 \cdot 8H_2O$ | 10 | 1.54 | 14 |
| (4) Saturated $Ba(OH)_2 \cdot 8H_2O$ | 10 | 1.62 | 14 |
| (5) 5-molar NaOH | 1 | 0.21 | 5 |
| (6) 5-molar NaOH | 1 | 0.25 | 4 |

EXAMPLE XIII

The polymerization reaction of Example I is repeated with the exception that .021 mole of hexamethylene diamine is substituted for hydroquinone and .03 mole of barium hydroxide is employed as the buffering agent. The reaction is conducted for 10 seconds in the blender of Example I and 10 milligrams of white polymer product is recovered from the blender.

We claim:
1. A process for the preparation of polyphosphate and polyphosphonate resins comprising the steps of:
preparing a first solution containing a phosphorylating agent in a water immiscible organic solvent therefor, said agent having the structural formula:

where X is selected from the group consisting of halogens; Y is selected from the group consisting of the halogens, R, OR, $NR_2$, and R is selected from the group consisting of alkyl groups, phenyl groups, alkenyl groups, and aralkyl groups;
preparing a second solution in an aqueous medium of a reactant selected from the group consisting of aliphatic and aromatic dihydroxylic compounds dispersible in said aqueous medium;
combining the first and second solutions and maintaining the same in an oxygen free reaction zone for a period of time to permit interfacial reaction of said phosphorylating agent with said reactant, and
providing a quantity of a buffering agent selected from the group consisting of sodium bicarbonate, sodium carbonate, sodium triphosphate, disodium monophosphate, a mixture of sodium hydroxide and potassium chloride, and compounds which by reason of their limited solubility in the aqueous system provide a buffering action in the combination of said first and second solutions sufficient to adjust the pH of the aqueous phase thereof to a value within the range of 8 to 14 and to maintain the pH at a substantially constant value within said range throughout the period of said interfacial reaction.

2. A process according to claim 1, wherein is included the step of introducing nitrogen gas into said second solution prior to said combining of the first and second solutions and continuing said introduction until said interfacial reaction is substantially complete.

3. A process according to claim 1, wherein is included the step of raising the temperature of the combination of said solutions to a level above 20° C. and below the boiling point of any of the components of said solutions.

4. A process according to claim 1, wherein is included the step of lowering the temperature of the combination of said solutions to a level below 20° C. and above the freezing point of any of the components of said solutions.

5. A process according to claim 1, wherein said combining step includes the steps of adding said first solution to said second solution and stirring said solutions until said interfacial reaction is substantially complete.

6. A process according to claim 1, wherein said second liquid phase reactant comprises a polyhydroxylic organo compound selected from the group consisting of hydroquinone, 1,3-dihydroxyacetone, 1,4-butanediol, 1,4-cyclohexanol, resorcinol, bisphenol-A, 2,2-dimethyl-1,3-propanediol and ethylene glycol.

7. A process according to claim 1, wherein said phosphorylating agent is selected from the group consisting of phenylphosphonic dichloride, phosphorous oxychloride and phenylphosphorodichloridate.

8. A process according to claim 1, wherein said buffering agent is present in said second solution in higher concentration than the solubility of said agent in said solution.

9. A process according to claim 1, wherein said buffering agent is selected from the group consisting of barium hydroxide and calcium hydroxide.

10. A process according to claim 9, wherein said buffering agent is barium hydroxide and wherein the ratio of said phosphorylating agent to said polyhydroxylic compound is within the range of 2:1 to 1:2.

References Cited

UNITED STATES PATENTS

| 2,636,876 | 4/1953 | Zenftman et al. | 260—61 |
| 2,900,365 | 8/1959 | Haven | 260—47 |
| 3,227,685 | 1/1966 | Nielsen et al. | 260—47 |
| 3,290,258 | 12/1966 | Nielsen et al. | 260—2 |
| 3,298,967 | 1/1967 | Mason | 260—2 |

FOREIGN PATENTS

| 125,566 | 1/1960 | Russia. |
| 610,953 | 3/1962 | Belgium. |
| 610,954 | 3/1962 | Belgium. |

OTHER REFERENCES

Shuto, Kogyo Kagaku Zasshi 67, 380–84 (1964).
Rubtsova, Plasti. Massy 1961, (No. 3) 13–14, (No. 2) 22–24.
Kuznetsov et al., Vysokolmolekul. Soedin. 6, 1318–22 (1964).

WILLIAM H. SHORT, Primary Examiner

M. GOLDSTEIN, Assistant Examiner

U.S. Cl. X.R.

260—2, 30.8, 32.6, 32.8, 33.4, 29.2